(12) United States Patent
Davis et al.

(10) Patent No.: US 8,997,050 B2
(45) Date of Patent: Mar. 31, 2015

(54) TSQL DEBUG BREAKPOINT INTEROPERABILITY ACROSS HETEROGENEOUS PROJECTS

(75) Inventors: Jeffrey A. Davis, Snohomish, WA (US); James D. Laflen, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 218 days.

(21) Appl. No.: 13/356,611

(22) Filed: Jan. 23, 2012

(65) Prior Publication Data

US 2013/0191815 A1 Jul. 25, 2013

(51) Int. Cl.
*G06F 9/44* (2006.01)
*G06F 9/455* (2006.01)

(52) U.S. Cl.
CPC ................ *G06F 9/45508* (2013.01)
USPC ............. 717/124; 717/106; 717/108

(58) Field of Classification Search
None
See application file for complete search history.

(56) References Cited

U.S. PATENT DOCUMENTS

| | | | |
|---|---|---|---|
| 7,185,319 B2 | 2/2007 | Kaler et al. | |
| 7,225,431 B2 | 5/2007 | Gschwind et al. | |
| 7,500,225 B2 | 3/2009 | Khan et al. | |
| 2006/0064677 A1 | 3/2006 | Bickson et al. | |
| 2012/0198416 A1* | 8/2012 | Sirr et al. | 717/104 |

OTHER PUBLICATIONS

Chen, et al., "An construction of debugging environment for heterogeneous computing based on GDB", Retrieved at <<http://ieeexplore.ieee.org/stamp/stamp.jsp?arnumber=05974876>>, International Conference on Computer Science and Service System (CSSS), Jun. 27-29, 2011, pp. 174-177.
Fors, Tim, "IDEBUG—The IBM Distributed Debugger", Retrieved at <<http://www.ibm.com/developerworks/ibm/library/i-debug/index.html>>, Aug. 1, 2000, pp. 6.
"Debugging in Visual Studio .NET", Retrieved at <<http://msdn.microsoft.com/en-us/library/aa290350(v=vs.71).aspx>>, Retrieved Date: Nov. 8, 2011, pp. 6.
Funika, et al., "Cooperative Interoperability of Debugger and Editor in Distributed Tools Environment", Retrieved at <<http://citeseerx.ist.psu.edu/viewdoc/download?doi=10.1.1.108.8520&rep=rep1&type=pdf>>, Retrieved Date: Nov. 8, 2011, pp. 8.
Davis, et al., "N-Way Runtime Interoperative Debugging", U.S. Appl. No. 13/167,729, filed Jun. 24, 2011, pp. 29.

* cited by examiner

*Primary Examiner* — Chuck Kendall
(74) *Attorney, Agent, or Firm* — Brian Haslam; Kate Drakos; Micky Minhas

(57) ABSTRACT

TSQL debug breakpoint interoperability across heterogeneous project systems within an IDE can be provided. A user can set a breakpoint in the user's SQL source code and the breakpoint can be triggered by the code within another project. Breakpoints can be set and triggered within SQL source code tiles that reside in one or more SQL Database projects. Binding of the application project being debugged with one or more SQL Database projects that reside within the IDE session can be automated, SQL artifacts not found in any of the SQL Database projects can be debugged.

25 Claims, 9 Drawing Sheets

```
[VS Debug Package]
if StartupProject.EnableSQLDebugging property enabled                    252
{
    Call QueryService for IDBNotifyDebugEvent Service
    if IDBNotifyDebugEvent Service is found                              254
    {
        Set ListOfServers = IDBNotifyDebugEvent.GetDebuggableServers();  256
        For each server in ListOfServers                                 258
        {
            // Call to SQL Debug Engine
            // initialize SQL Debugging for this server
            [SQL Debug Engine].Initialize(server);
        }
    }
}                                                                        250
```

FIG. 2b

```
[SSDT Debug Package]
IDBNotifyDebugEvent.GetDebuggableServers()                               262
{
    Set ListOfDebuggableServers = Empty;
    For each Project in Solution
    {
        if Project is a SQL Database Project                             264
        {
            If Project.Connection is Connected                           266
            {
 268            Add Project.ConnectionString.ServerName to ListOfDebuggableServers
            }
        }
    }
    Return ListOfDebuggableServers                                       269
}
                                                                         260
```

FIG. 2c

```
[VS Debug Package]
For each pending breakpoint in Solution
{
    BreakPoint = [SQL Debug Engine].CreatePendingBreakpoint(BreakpointRequest);  272
}

[SQL Debug Engine]
CreatePendingBreakpoint(BreakpointRequest)                                       274
{
    Create and initialize a new Breakpoint based on the info provided in the
BreakpointRequest
    Attach/Add Breakpoint to Current DebugProgram                                276
}

[SQL Debug Engine]
(In response to a new connection from the SQL Debug Core Engine)
OnNewConnection(Server, Database, StoredProcedureID)
{
    Create a new SQL Debug Execution Thread                                      278
    Add SQL Thread to list of Threads for this 'Debug Process'                   279
}                                                                                270
```

```
[SQL Debug Engine]
(In response to a SQL procedure 'entering' execution from the SQL Debug Core Engine)
OnPush(Server, Database, StoredProcedureID)                                      282
{
    // Find the SQL Thread for this server, database and SPID
    Set CurrSQLThread = FindThread(Server, Database, StoredProcedureID)          284

// Get the DebugDocument associated with this SPID.
    // Note: The info in the DebugDocument contains the url or file path of the
    // actual VS document that should be used when binding the breakpoint
    // or stepping into.
    Set CurrSQLThread.DebugDocument = [SSDT Debug Project                        286
Service].GetDebugDocument(Server,
                                    Database,
                                    StoredProcedureID)
    // Tell the SQL Engine about this list of breakpoints for this 'DebugDocument'
    For each breakpoint in [Pending Beakpoint List]                              288
        [SQL Debug Core].SetBreakPoint(breakpoint)
}                                                                                280
```

```
(In response to a breakpoint being triggered within the SQL Debug Core Engine)
OnBPHit(lineSpan)                                                              292
{
    Set BreakPointEvent = CreateBreakpointEvent(CurrSQLThread)
    Signal BreakpointEvent to [VS Debug Package]                               294
}

[SQL Debug Engine]
(In response to a breakpoint event from the VS Debug Package)
GetPositionFromSpan(lineSpan)                                                  296
{
    // The SQL Debug Core only knows about line offsets relative to an programmability object within a
    // single online buffer e.g. it doesn't know about multiple objects within a buffer.
    Return CurrSQLThread.DebugDocument.LineOffset;                             298
}                                                                              290
```

```
[SSDT Debug Project Service]
GetDebugDocument(Server, Database, objectId)                                   232
{
    // create MSSQL:: type url from Server name, Database and objectId
    Set url = CreateSQLUrl(Server, Database, objectId);                        234

// Does DebugDocument already exist?
    Set DebugDocument = FindDocumentInHashTable(url)
    If DebugDocument Found
        Return DebugDocument                                                   236

// create a new DebugDocument
    Set DebugDocument = CreateDebugDocument();                                 238

// bind url to Debug Document
    Set DebugDocument.Url = url;
    Set DebugDocument.Moniker = url;                                           239
    Set DebugDocument.LineOffset = 0;
```

230

```
// Is SQL object in SSDT Project Hierarchy?
Set IsFound = false
For each Project in Solution
{
  If Project.Connection.DataSource == Server AND
    Project.Connection.DatabaseName == Database
  {
    // Each project node has a reference to the Database Model which can be
    // queried to obtain source code attributes for a given programmability object.
    For each [Programability Object] in [Database Model]                          242
    {
        If [Programability Object].objectId == objectId
      {
        // Update the Moniker and source code line offset based on the contents of the
        // project artifact
        Set DebugDocument.Moniker = [Programability Object].SourceName            244
        Set DebugDocument.LineOffset = [Programability Object].SourceLineOffset
        Set IsFound = true;
        Exit For
      }
    }
    If IsFound == true
      Exit For
  }
}
```

```
// If the SQL object was still not found SSDT Project Hierarchy
// then look for an existing online buffer
If IsFound == false
{
    For each [Online Buffer] in [Online Buffer Manager]
    {
        If [Online Buffer].Connection.DataSource == Server AND
          [Online Buffer].Connection.DatabaseName == Database                    246
        {
            // The online buffer has a reference to the Database Model which can be
            // queried to obtain source code attributes for a given programmability object.
            For each [Programability Object] in [Online Buffer]     {
            {
                If [Online Buffer].objectId == objectId
                {
                    // Update the Moniker and source code line offset based on the contents of the
                    // online buffer
                    Set DebugDocument.Moniker = [Online Buffer].SourceName
                    Set DebugDocument.LineOffset = [Programability Object].SourceLineOffset   248
                    Set IsFound = true;
                    Exit For
                }
            }
        }
        If IsFound == true
            Exit For
    }
}

// If we still haven't found it add it to the Virtual Online Hierarchy so that
// Visual studio will be able to reconcile the MSSQL:: url.
If IsFound == false
{
    // reverse engineer sql script using the Server name, Database and objectId
    Set DebugDocument.SqlScript = GetSqlScript(Server, Database, objectId);         250
    Add DebugDocument to [Online Virtual Project Hierarchy]
}

Return DebugDocument;
```

TSQL DEBUG BREAKPOINT INTEROPERABILITY ACROSS HETEROGENEOUS PROJECTS

BACKGROUND

Structured Query Language (SQL) is a standardized computer language that uses declarative statements to query, alter and define relational databases. Transact-SQL (TSQL) is a Turing-complete extension to SQL that supports procedural programming and local variables. TSQL also provides support functions for string processing, date processing, mathematics, and so on.

A stored procedure is a subroutine that accesses a relational database system. The stored procedure can be called by an application. Typically the stored procedure is stored in the database data dictionary. Stored procedures are typically used for tasks including but not limited to data validation and access control mechanisms, Stored procedures can also be used to consolidate and centralize logic that is used by multiple applications. One stored procedure can call another stored procedure.

Stored procedures may return result sets, (e.g., a particular stored procedure could return the results of a SELECT statement). Stored procedures may also include declared variables for processing data and cursors that allow it to loop through multiple rows in a table. Stored procedures can receive variables, return results or modify variables and return them, A user-defined function (UDF) can extend the functionality of a database server by adding a function that can be evaluated in SQL statements. SQL distinguishes between scalar functions, table functions and aggregate functions. A scalar function returns only a single value (or NULL), whereas a table function returns a (relational) table comprising zero or more rows, each now with one or more columns. An aggregate function operates on a collection of data and returns a single result (e.g., AVG is an aggregate function that returns the average of a group of numbers). Once created, a user-defined function may be used in expressions in SQL statements.

SUMMARY

Fully functional SQL debugging interoperability within an IDE using one or more database projects within a solution is enabled. A developer typically expects to use an artifact that he creates or consumes, e.g. the source code files within his project(s), when working with an integrated debugger. Debugging interoperability also means that a non-database project, that uses data access APIs to interact with a database in which that database is encapsulated by a Database project in that solution, can trigger breakpoints in the database project.

One example of heterogeneous project systems is a SQL Database project and an ASP.NET project in which the ASP.NET project references SQL code in the SQL Database project. In this example, a user can set a breakpoint in the user's SQL source code and the breakpoint can be triggered by the code within the ASP.NET project. That is., in a heterogeneous project system comprising a SQL Database project and a second project that is not a SQL Database project, the second project referencing SQL code in the SQL Database project, a breakpoint in the SQL code in the SQL Database project can be triggered by code in the second project. Breakpoints can be set and triggered within SQL source code files that reside in one or more SQL Database projects. Binding of the application project being debugged with one or more SQL Database projects that reside within the IDE session can be automated. SQL artifacts not found in any of the SQL Database projects can be debugged.

Database project artifacts can be bound with the execution context of the database engine and debugger. Breakpoints in online buffers can be stepped into or can be set even though the buffers include multiple procedures and no existing project artifact exists. Database projects within a debug session in an IDE can be bound to a startup application project.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 2*b* illustrates an example of pseudo code 250 in accordance with aspects of the subject matter disclosed herein;

FIG. 2*c* illustrates an example of pseudo code 260 in accordance with aspects of the subject matter disclosed herein;

FIG. 2*d* illustrates an example of pseudo code 270 in accordance with aspects of the subject matter disclosed herein;

FIG. 2*e* illustrates an example of pseudo code 280 in accordance with aspects of the subject matter disclosed herein;

FIG. 2*f* illustrates an example of pseudo code 290 in accordance with aspects of the subject matter disclosed herein;

FIG. 2*g* illustrates an example of pseudo code 230 in accordance with aspects of the subject matter disclosed herein;

DETAILED DESCRIPTION

Overview

Figure 1:
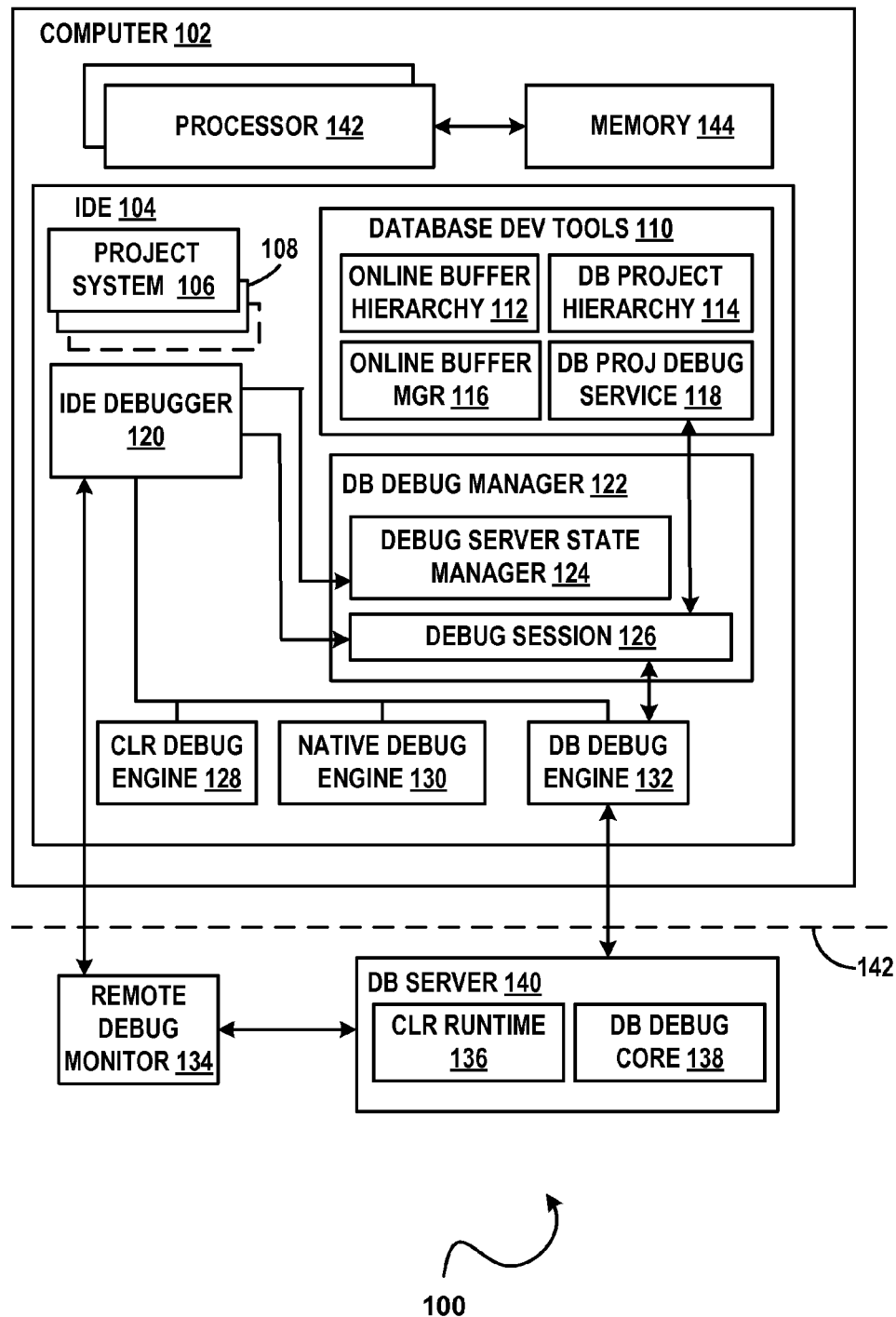
FIG. 1 illustrates an example of a system 100 that interoperatively debugs heterogeneous projects in accordance with aspects of the subject matter disclosed herein.

Traditionally, to debug programmability objects such as stored procedures and UDFs, database developers used reversed engineered SQL Objects. Because SQL stores programmability objects (stored procedures, UDFs and so on) within a system table, recreating or reverse engineering the code of the programmability objects is a simple matter of querying this table. In some IDEs such as Microsoft's Visual Studio® a SQL object browser such as ServerExplorer can allow a developer to open and view the contents of a programmability objects without having the original source code. This feature can be used to reverse engineer programmability objects into an editor buffer (also known as an online buffer). Developers can use this facility in conjunction with some available debugging options to perform SQL debugging. No facility was previously provided for the developer to use a database project that included the developer's original source code as the location in which a breakpoint was set. Furthermore, the reverse engineered object may not be exactly the same as the project artifact. For example, text formatting or additional comments may not be the same in the reversed engineered version as in the original source. Additionally developers may have stored multiple objects, e.g. StoredProcedure1, StoredProcedure2, etc., within a single source code file—which cannot be represented in the reversed engineered version.

For example, consider the following trivialized example of a Microsoft Visual Studio® solution that includes two projects—a "data aware" client project (one that accesses data in a database but does not define or redefine the database) and a SQL Database project. Suppose the data aware client project includes one source code file:

```
Program.cs:
using System.Data.SqlClient;
namespace ConsoleApplication1
{
  class Program
  {
    static void Main(string[ ]args)
    {
      // connect to my SQL Database
      using (SqlConnection conn = new SqlConnection(@"Data Source=myserver\sql2012; Initial Catalog=mydatabase"))
      {
        conn.Open( );
        // execute the SQL store procedure 'MyProcedure' that
        // is defined in my SQL dtatabase project
        SqlCommand cmd = new SqlCommand("Exec MyProcedure 5");
        cmd.ExceuteReader( );
      }
    }
  }
}
```

Suppose the SQL Database project includes one source code file that includes the definition of the stored procedure 'MyProcedure' referenced in the 'Data Aware' project above:

```
MyProcedure.sql:
  CREATE PROCEDURE dbo.MyProcedure1
  (
    @parameter1 int
  )
  AS
    @parameter1 = @parameter1 + 1
    RETURN @parameter1
```

In this example when the developer is debugging his data aware project and he has set a breakpoint on a line within the MyProcedure.sql source code file included in his SQL Database project, he typically expects that the breakpoint will be triggered and the debugger will be stopped at the location he set the breakpoint in his SQL source code file. Traditionally, however, this was not the case.

TSQL programmability objects can be debugged by connecting to the database, opening the programmability object to be debugged, and stepping into the programmability object. This enables the developer to inspect the source code of the programmability object that he/she would like to debug or execute. Another way to debug a programmability object is to debug the programmability object as it is called through a client application by enabling application debugging and SQL debugging in the project that calls the programmability objects. Once the application has started, the TSQL programmability object on the database server can be opened and a breakpoint can be set in the programmability object. An option in the application debugging software in the integrated development environment (IDE) can be activated to hit the breakpoint. This method of debugging can also be used with Web applications that call TSQL programmability objects.

The methods described above utilize online reversed engineered artifacts on the database server. By enabling both application debugging on the server and TSQL debugging in the IDE, the user can set breakpoints in the reversed engineered SQL artifacts and have the breakpoints be triggered by the application project. However, if the user already has a particular programmability object within the user's project, the user may not realize another reversed engineered instance of the programmability object has to be opened to set a breakpoint. Another consequence of the methods described above is that breakpoints are not persisted after closing the debug session in the IDE. Moreover, the methods described do not automatically bind the Data Connection node and the application. That is, the developer has to explicitly enable SQL Application debugging on a server by server basis. This step can be easily forgotten by the user and is complicated by the fact that the list of available servers is not prominently displayed.

In accordance with aspects of the subject matter described herein, SQL Debugging is automatically enabled on a given server based on the SQL Database projects and their associated connection strings. Interoperative debugging of heterogeneous project systems in which one or more projects contain SQL code can be performed within an IDE. A heterogeneous debug session is a mixed language debug session in which one of the languages being debugged is SQL. One of the heterogeneous projects participating in the debug session can be a database project such as a SQL database project. One or more breakpoints can be placed in a SQL artifact (e.g., a programmability object) such as a TSQL script. When a project that consumes the TSQL script is debugged and a data access call is made by the script into one or more SQL databases, breakpoint debugging activities can be initiated in response to encountering the breakpoint(s). The SQL code running on the database debugger can be correlated back to the project source code on the debuggee, even in the absence of a file that stores debugging information. The execution logic on the database server can be automatically (programmatically, without additional user direction) bound to the project artifact. The database project can be automatically (programmatically, without additional user direction) bound to the non-database project that is hosting the remote debugger.

To participate in a heterogeneous debug session, zero or more database servers can be provided to the heterogeneous debugger when the debugging session is initialized. A service that implements an interface that notifies the debug engine of detected debug events can be provided. In response to selection of a SQL debugging option, the infrastructure of the debug software in the IDE can instruct the database debug engine to initialize SQL debugging for each Database server. Once each server has been initialized for the debug session, breakpoint binding event notifications can be sent to the database debug engine allowing the database debug engine the opportunity to map the breakpoint to either a project artifact or to an online buffer. Event notifications for detection of a step into user gesture can map the gesture to a project artifact or online buffer.

TSQL Debug Breakpoint Interoperability Across Heterogeneous Projects

FIG. 1 illustrates an example of a system 100 that interoperably debugs heterogeneous projects in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an integrated development environment or IDE such as IDE 104 or may execute outside of an IDE. The IDE can be an IDE such as the one described with respect to FIG. 4 or can be any other IDE or can execute wholly or partially outside an IDE. All or portions of system 100 may be implemented as a plug-in or add-on.

System 100 may include one or more computers or computing devices such as a computer 102 comprising: one or more processors such as processor 142, etc., a memory such as memory 144 and an integrated development environment or such as IDE 104. IDE 104 can be an IDE such as but not limited to Microsoft Corporation's Visual Studio®. IDE 104 can include an IDE debugger such as IDE debugger 120. IDE 104 can include one or more projects such as project system 106, project system 108 and so on. Project system 106 and/or project system 108, etc. can be a native code project or a managed code project. Project system 106 and/or project system 108, etc. can be a C# project, a VB project, a database project (e.g., a SQL project) or any kind of project.

IDE 104 can include database developer tools such as database developer tools 110. Database developer tools 110 can include a hierarchy such as online buffer hierarchy 112. The online buffer hierarchy 112 can include the collection of buffers that are transient and typically represent and enable management of the reversed engineered programmability objects. Database developer toots 110 can include a database hierarchy such as database project hierarchy 114 which can include the collection of files included within the project and which manages the files in the project. Database developer toots 110 can include a buffer manager such as online buffer manager 116. Database developer tools 110 can include a database debugging service such as database project debugging service 118. IDE 104 can include a database debug manager such as database debug manager 122. Database debug manager 122 can include a debug server state manager such as debug server state manager 124. Database debug manager 122 can manage SQL debugging. Database debug manager 122 can include a process such as debug session 126. IDE 104 can interact with a hierarchy as a means of interfacing with a document collection consistently. A project system, whether it is Native, SQL Database, ASP.NET, etc. can expose at least one hierarchy to conform with the IDE.

IDE 104 can include one or more debug engines including but not limited to a CLR (common language runtime) debug engine such as CLR debug engine 128, a native debug engine such as native debug engine 130, a database debug engine such as database debug engine 132 and so on. On the same computer or on another computer connected to computer 102 via a network can be a remote debug monitor such as remote debug monitor 134. The same computer or another computer connected to computer 102 via a network can be a database server such as database server 140. Database server 140 can include a CLR runtime such as CLR runtime 136. Database server 140 can include a database debug core engine such as database debug core engine 138. System 100 may also include other components (not shown) known in the arts.

Figure 2A:
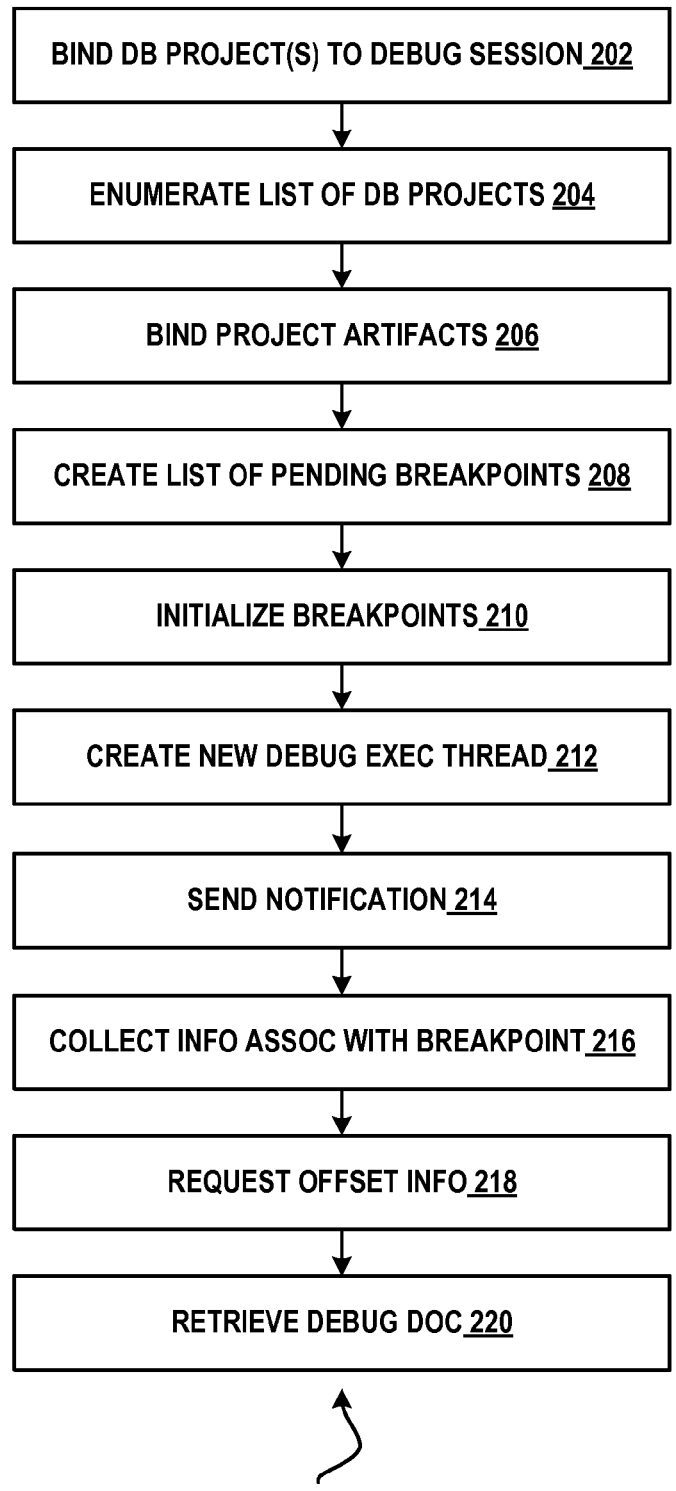
FIG. 2*a* illustrates an example of a method 200 that interoperatively debugs heterogeneous projects in accordance with aspects of the subject matter disclosed herein.

FIG. 2a illustrates a method 200 that can interoperatively debug heterogeneous projects in accordance with aspects of the subject matter disclosed herein. The method described in FIG. 2a can be practiced by a system such as but not limited to the one described with respect to FIG. 1. While method 200 describes a series of acts that are performed in a sequence, it is to be understood that method 200 is not limited by the order of the sequence. For instance, some acts may occur in a different order than that described. In addition, an act may occur concurrently with another act. In some instances, not all acts may be performed.

At 202 one or more database projects such as but not limited to a SQL database project can be bound to an application project debug session (e.g., debug session 126). The pseudo code 250 displayed in FIG. 2b describes one way to implement this process in Visual Studio. The IDE debugger 120 can determine if database debugging is enabled in the startup project (section 252). Multiple startup projects can exist. The startup project or projects can be a native code project, an ASP.NET project, a C# project, or any other kind of project except for a database project. Project system 106, 108 or another project can be designated as the startup project. If the startup project exposes debug event notifier software, (section 254), the IDE debugger 120 can query the debug server state manager 124 (section 256) for a list of servers associated with the startup project. The IDE debugger 120 can make a call to the database debug engine 132 for each of the servers in the server list and initialize database debugging for each server in the list of servers for the project for the current debug session (section 258). Database debugging can be on a per server basis. Consequently, all the databases on the identified server can be bound to the debug session.

The database debugging service 118 can enumerate a list of database projects in the solution at 204. The pseudo code 260 displayed in FIG. 2c describes one possible implementation of this process in Visual Studio. The database developer tools 110 can expose an interface to the IDE to a service that notifies the IDE of debug events, the database debugging service 118, section 262. The list of database projects in the solution include the list of the debuggable servers. The database developer tools 110 can check each project in the solution. If the project is a SQL database project, section 264, the database developer tools 110 can determine if a connection has been established for the project to the debug session, section 266. If a connection has been established for the project, the server name can be added to the list of debuggable servers, section 268. The list of debuggable servers can be returned to the IDE 104 to enable one or more of the debuggable servers to participate in the current debug session 126, section 269.

At 206 the database project artifacts can be bound to the execution context of the database debug engine 132. The pseudo code 270 displayed in FIG. 2d and the pseudo code 280 displayed in FIG. 2e describes an example of an implementation of this process in Visual Studio. In accordance with aspects of the subject matter disclosed herein, project artifacts are reconciled with the runtime execution of the SQL Engine for breakpoints and for stepping activities.

At 208 the IDE 104 can maintain a list of pending breakpoints for each project bound to the debug session. The pending breakpoint list can include information such as the name of the file that includes a breakpoint and the line number of the breakpoint. Any of the pending breakpoints in the pending breakpoint list can be encountered when the associated execution thread executes. The IDE debugger 120 can create a pending breakpoint request for each breakpoint in each database project artifact for database projects bound to the debug session, section 272. The IDE debugger 120 can send the pending breakpoint request to the database debug engine 132, section 274.

At 210 the database debug engine 132 can receive the pending breakpoint requests and create and initialize a new breakpoint for each breakpoint request received. The database debug engine 132 can attach or add the created breakpoints to the current debug program, section 276. In response to creation of a new connection from the database debug core engine, a new database debug execution thread can be created, section 278 and the database debug execution thread can be added to the list of threads for this debug process, section 279. In response a programmability object entering execution on the database debug engine 132 can notify the IDE 104 of a change of state of any associated pending breakpoint. This notification allows the IDE 104 to provide a visual cue to a user that the associated pending breakpoints can now potentially be encountered because the associated pending breakpoints have come into context.

At 212 in response to a programmability object entering execution from the database debug core engine 138, section 282 of pseudo code 280, the database debug engine 132 can collect information on the server, database and programmability object identifier for the new connection 282.

At 214 the database debug engine 132 models a virtual process. The database debug engine 132 in response to receiving a push notification from the database debug core engine 138 that a database programmability object has entered execution at the database debug core engine 138, the notification including the name of the server associated with the programmability object, the associated database and the programmability object identifier of the programmability object being debugged, the database debug engine 132 can determine the thread associated with the server, database and programmability object identifier. The currently executing thread can be set to this thread, section 284. The debug document associated with this programmability object identifier can be obtained. The information included in the debug document can include the URL or file path of the actual document in the project in the IDE that is used when binding the breakpoint or stepping into the code, section 286. The database debug engine 132 can remap between a thread of execution to the associated debug document by calling the database project hierarchy 114. The IDE debugger 120 can notify the database debug engine 132 of the list of breakpoints for the debug document. For each breakpoint in the list of pending breakpoints, the database debug engine 132 can tell the database debug core engine 138 to set the corresponding breakpoint, section 288.

At 216 the database debug engine 132 can, in response to receiving a notification from the database debug core engine 132 that a breakpoint has been triggered within the database (described in pseudo code 290 in FIG. 2*f*, section 292) debug core engine 138, can collect information associated with the location of the breakpoint in the programmability object. An event that includes the identity of the currently execution database thread can be created and the event can be sent to the IDE debugger 120, section 294.

At 218 the database debug engine 132, in response to receiving notification of a database breakpoint event from the IDE debugger 120, can ascertain the location of the breakpoint in the programmability object being debugged by issuing a call to the database debug core engine 138 requesting line offset information, section 296. The database debug core engine 138 only knows about line offsets relative to an programmability object within a single online buffer. It does not know about multiple objects within a buffer. The database debug engine 132 can return the line offset of the breakpoint of the associated debug document in the currently executing database thread, section 298, enabling the IDE 104 to provide visual cues to the user regarding triggering of the breakpoint and the line number of the breakpoint, etc.

At 220 the database debugging service 118 can retrieve the debug document associated with the server, database, and the programmability object identifier, as illustrated in pseudo code 230 of FIG. 2*g*, section 232. This information can be converted to a URL, section 234. A hash table keyed by the URL can be accessed to find the debug document associated with the URL. If the debug document exists, the debug document can be located and retrieved using a hash table keyed on the URL, section 236. If the debug document does not exist, a new debug document can be created, section 238. The debug document can be bound to the indicated URL, section 239. The online buffer hierarchy 112 can be searched for the programmability object. For each project in the solution 242, if the connected database matches the server and the connected database matches the database, source code attributes for the programmability object can be obtained from the database model, section 242 of pseudo code 241 of FIG. 2*g*.

The identifier and the source code line offset can be updated based on the contents of the project artifact, section 244. If the database object is not found in the database project hierarchy 114, each online buffer managed by the online buffer manager 116 can be searched for the database object. The online buffer can have a reference to the database model. The database model can be queried to obtain source code attributes for a programmability object. For each database object in each online buffer, the identifier of the programmability object can be compared to the database object identifier of the debug document, section 246. The debug document can be updated with the source name and source code line offset of the breakpoint based on the contents of the online buffer, section 248. If the database object is not found in the online buffers, the object can be added to the online buffer hierarchy 112 to enable the IDE 104 to reconcile URLs. The database script can be reverse engineered 250 using the server name, database and object identifier. The database script portion of the debug document can be set to the script obtained from the database server 140 and the debug document can be added to the online buffer hierarchy 112. The database debug document can be returned to the IDE 104, section 250.

Example of a Suitable Computing Environment

Figure 3:
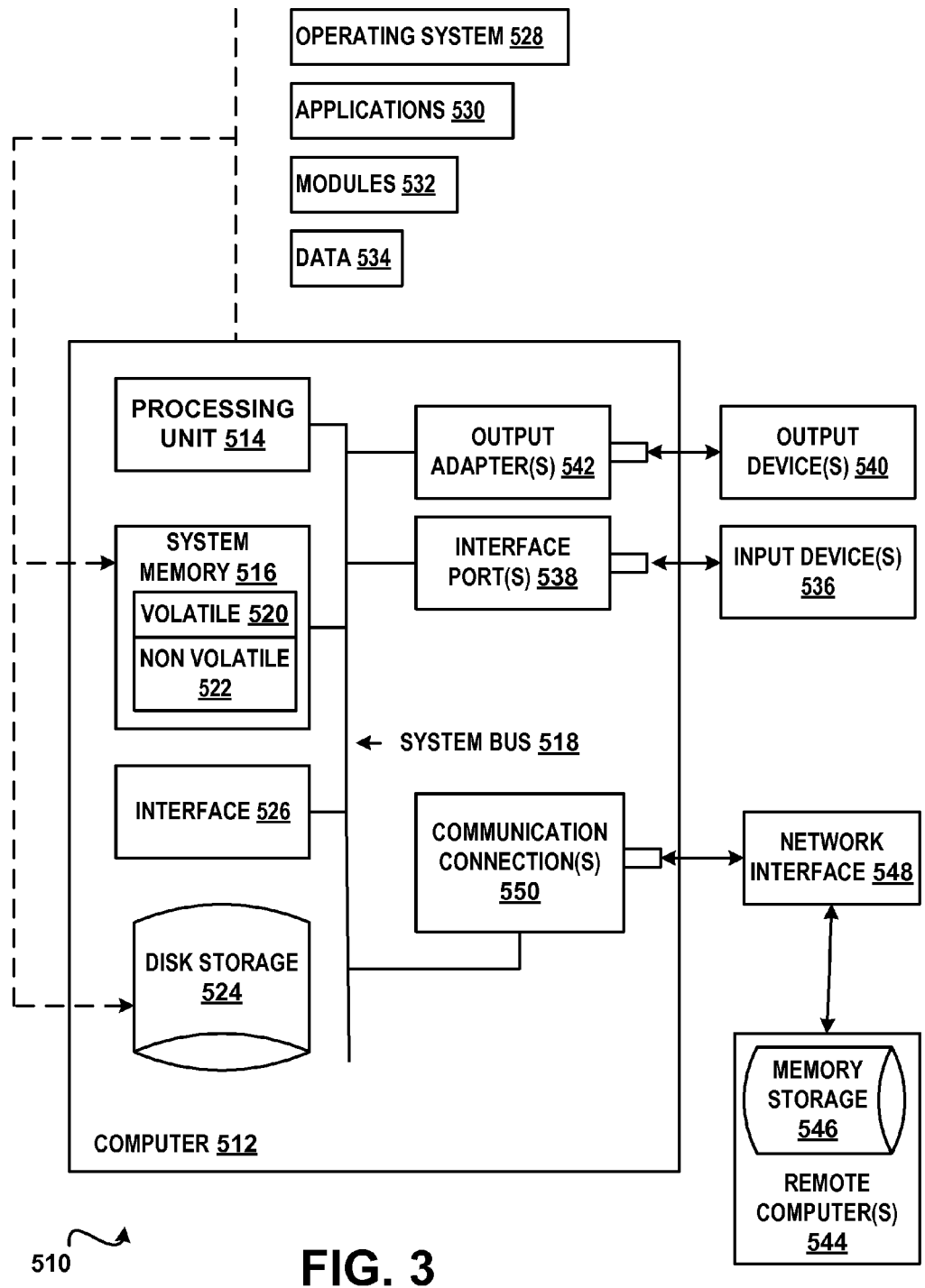
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROW, electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
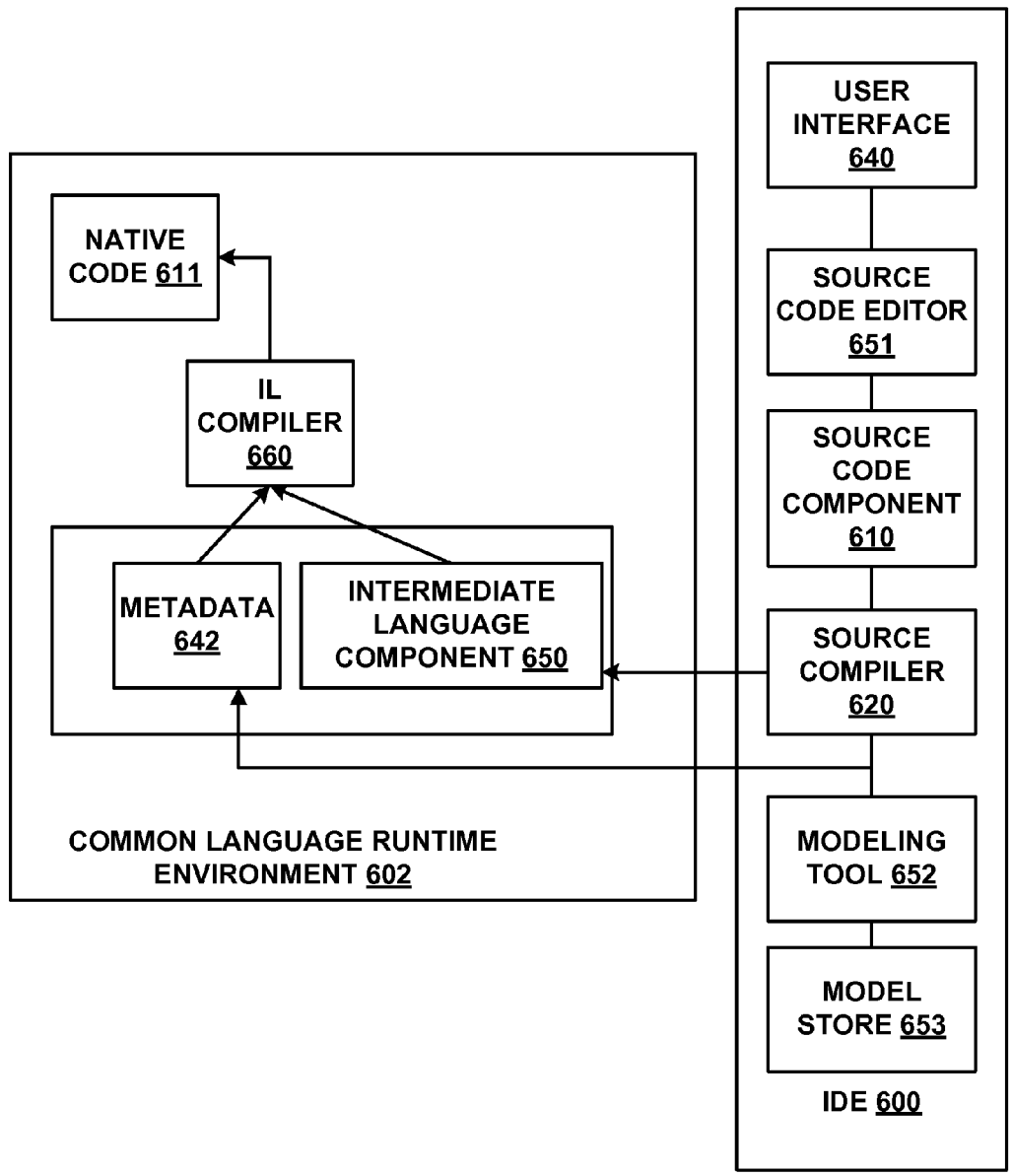
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making, code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module comprising a database debugging tool loaded into the memory causing the at least one processor to:
      interoperably debug heterogeneous projects in a single debug session, a first project comprising a database project and a second project comprising a non-database project, the first project comprising a programmability object in the database project, the programmability object referenced by code in the non-database project; and
      debug the programmability object in the single debug session in an IDE to which the database project and the non-database project are automatically programmatically bound.

2. The system of claim 1, further comprising:
   at least one module loaded into the memory causing the at least one processor to:
      interoperably debug the programmability object by triggering a breakpoint in the programmability object by code in the non-database project.

3. The system of claim 1, further comprising:
   at least one module loaded into the memory causing the at least one processor to:
      interoperably debug the programmability object by:
         connecting to a database associated with the database project;
         opening the programmability object to be debugged; and
         stepping into the programmability object.

4. The system of claim 1, further comprising:
   at least one module loaded into the memory causing the at least one processor to:
      identify at least one database associated with a server associated with the database project.

5. The system of claim 4, further comprising:
   at least one module loaded into the memory causing the at least one processor to:
      automatically programmatically bind a plurality of databases on the server to the single debug session.

6. The system of claim 1, wherein the programmability object is a TSQL script.

7. The system of claim 1, further comprising:
   at least one module loaded into the memory causing the at least one processor to:
      send breakpoint binding event notifications to a database debug engine; and
      map the breakpoint to an artifact in the database project or to an online buffer.

8. A method of interoperably debugging heterogeneous projects comprising:
   binding at least one database project to a debug session by a processor of a software development computer;
   binding at least one non-database project to the debug session;
   programattically and automatically obtaining a list of database servers associated with the at least one database project;
   determining at least one debuggable server in the list of database servers;
   binding database project artifacts associated with a database of the at least one debuggable server to the debug session;
   maintaining a list of breakpoints associated with the at least one database project;
   receiving a notification from a database server that a programmability object has entered execution at the at least one debuggable server; and
   display a visual user cue that a breakpoint in the list of breakpoints is triggerable.

9. The method of claim 8, further comprising:
   receiving information identifying a database server, a programmability object and a database associated with the programmability object; and
   obtaining a debug document associated with the received information.

10. The method of claim 9, further comprising:
    in response to receiving a notification from a database debug core engine that a breakpoint has been triggered within the database debug core engine, collecting information associated with a location of the breakpoint in the programmability object.

11. The method of claim 10, further comprising:
    sending an event notifying an IDE debugger of a currently executing database thread, the event identifying the currently executing database thread.

12. The method of claim 11, further comprising:
in response to receiving a notification of a breakpoint event, ascertaining a location of the breakpoint in the programmability object by requesting line offset information from the database;
receiving the line offset information; and
displaying the line number of the triggered breakpoint calculated from the line offset information.

13. The method of claim 12, further comprising:
obtaining a source code line offset from an online buffer.

14. The method of claim 12, further comprising:
obtaining a source code line offset from a project hierarchy.

15. A computer-readable storage medium, not including a signal per se, comprising computer-executable instructions which when executed cause at least one processor of a computing device to:
interoperably debug heterogeneous projects in a single debug session, a first project comprising a database project and a second project comprising a non-database project, the first project comprising a programmability object in the database project, the programmability object referenced by code in the non-database project; and
debug the programmability object in the single debug session in an IDE to which the database project and the non-database project are automatically programmatically bound.

16. The computer-readable storage medium of claim 15, comprising further computer-executable instructions, which when executed cause at least one processor to:
interoperably debug the programmability object by triggering a breakpoint in the programmability object by code in the non-database project.

17. The computer-readable storage medium of claim 15, comprising further computer-executable instructions, which when executed cause at least one processor to:
interoperably debug the programmability object by:
connecting to a database associated with the database project;
opening the programmability object to be debugged; and
stepping into the programmability object.

18. The computer-readable storage medium of claim 15, comprising further computer-executable instructions, which when executed cause at least one processor to:
identify at least one database associated with a server associated with the database project.

19. The computer-readable storage medium of claim 18, comprising further computer-executable instructions, which when executed cause at least one processor to:
automatically programmatically bind a plurality of databases on the server to the single debug session.

20. The computer-readable storage medium of claim 15, comprising further computer-executable instructions, which when executed cause at least one processor to:
send breakpoint binding event notifications to a database debug engine; and
map a breakpoint to an artifact in the database project or to a programmability object in an online buffer.

21. The system of claim 1, wherein the database project is a SQL database project.

22. The system of claim 1, wherein the programmability object is a SQL programmability object.

23. The method of claim 8, wherein the database project is an SQL database project.

24. The computer-readable storage medium of claim 15, wherein the programmability object is a SQL programmability object.

25. The computer-readable storage medium of claim 15, wherein the database project is an SQL database project.

* * * * *